United States Patent [19]
Bland et al.

[11] Patent Number: 5,557,758
[45] Date of Patent: Sep. 17, 1996

[54] BRIDGE BETWEEN TWO BUSES OF A COMPUTER SYSTEM THAT DETERMINES THE LOCATION OF MEMORY OR ACCESSES FROM BUS MASTERS ON ONE OF THE BUSES

[75] Inventors: Patrick M. Bland, Austin, Tex.; Richard G. Hofmann, Cary, N.C.; Sagi Katz, Haifa, Israel; Dennis Moeller; Lance M. Venarchick, both of Boca Raton, Fla.

[73] Assignee: International Business Machines Corporation, Armonk, N.Y.

[21] Appl. No.: 351,192

[22] Filed: Nov. 30, 1994

[51] Int. Cl.⁶ .................................................. G06F 13/00
[52] U.S. Cl. ........................................... 395/308; 395/306
[58] Field of Search .................................... 395/306, 308; 370/85.13

[56] References Cited

U.S. PATENT DOCUMENTS

| | | | |
|---|---|---|---|
| 5,191,653 | 3/1993 | Banks et al. | 395/885 |
| 5,191,657 | 3/1993 | Ludwig et al. | 395/306 |
| 5,446,869 | 8/1995 | Padgett et al. | 395/500 |

OTHER PUBLICATIONS

"82420/82430 PCIset ISA and EISA Bridges", Intel, Dec. 1993, pp. 15–19.
"Peripheral Component Interconnect", Revision I.O. Specification, Dec. 1992, Section 3.6.1.

Primary Examiner—Jack B. Harvey
Assistant Examiner—David A. Wiley
Attorney, Agent, or Firm—Anthony N. Magistrale; Daniel E. McConnell

[57] ABSTRACT

A bridge is provided between an industry standard architecture (ISA) bus and a peripheral controller interconnect (PCI) bus and performs memory cycles on both buses simultaneously when a master on the ISA bus initiates a memory transfer. Data is steered between the ISA and PCI buses when a slave on the PCI bus claims the memory address within a predetermined time period after the memory cycle is initiated on the PCI bus. The ISA bus is isolated from the PCI bus when no slave on the PCI bus claims the memory address. This allows the memory cycle to be completed on the ISA bus, and the memory cycle on the PCI bus is terminated.

18 Claims, 4 Drawing Sheets

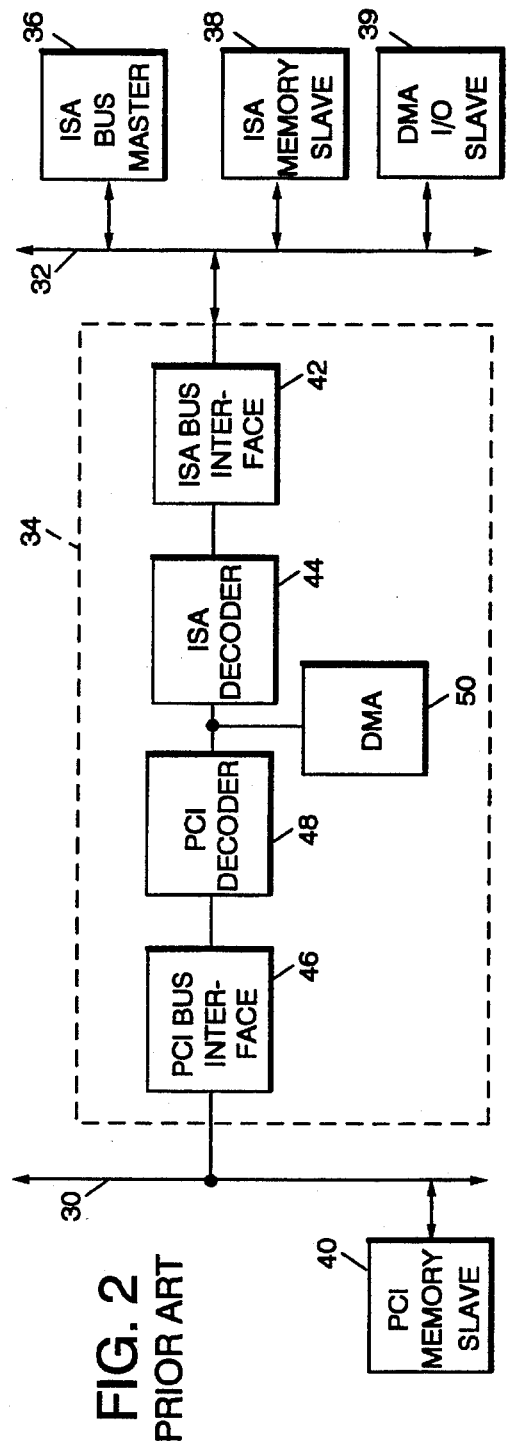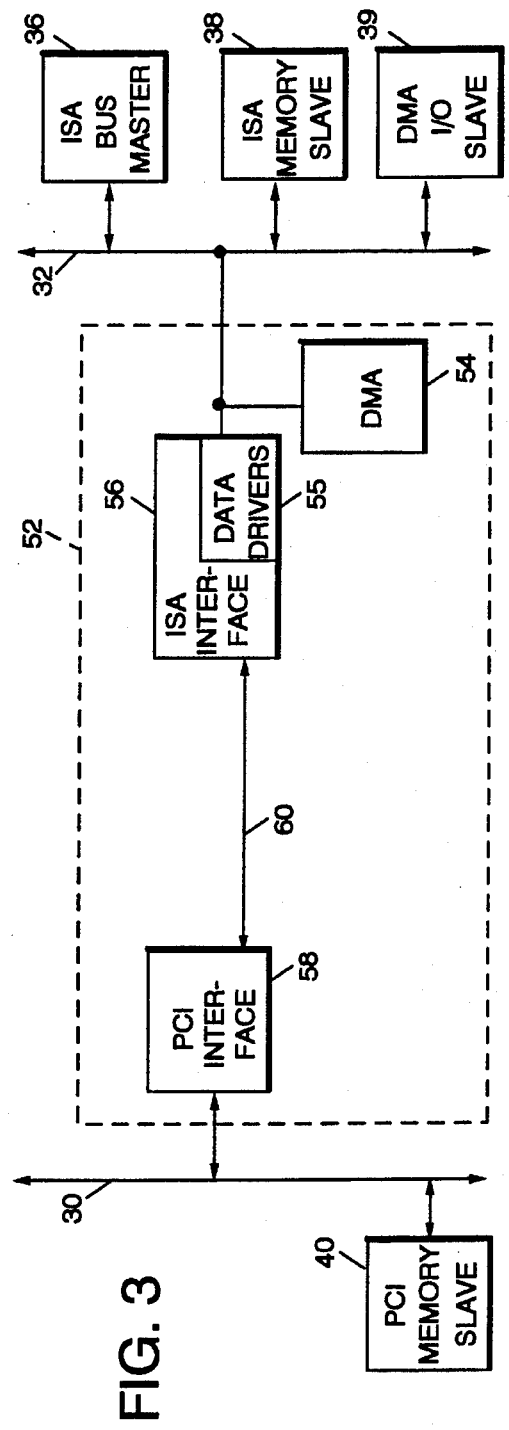
FIG. 2 PRIOR ART
FIG. 3

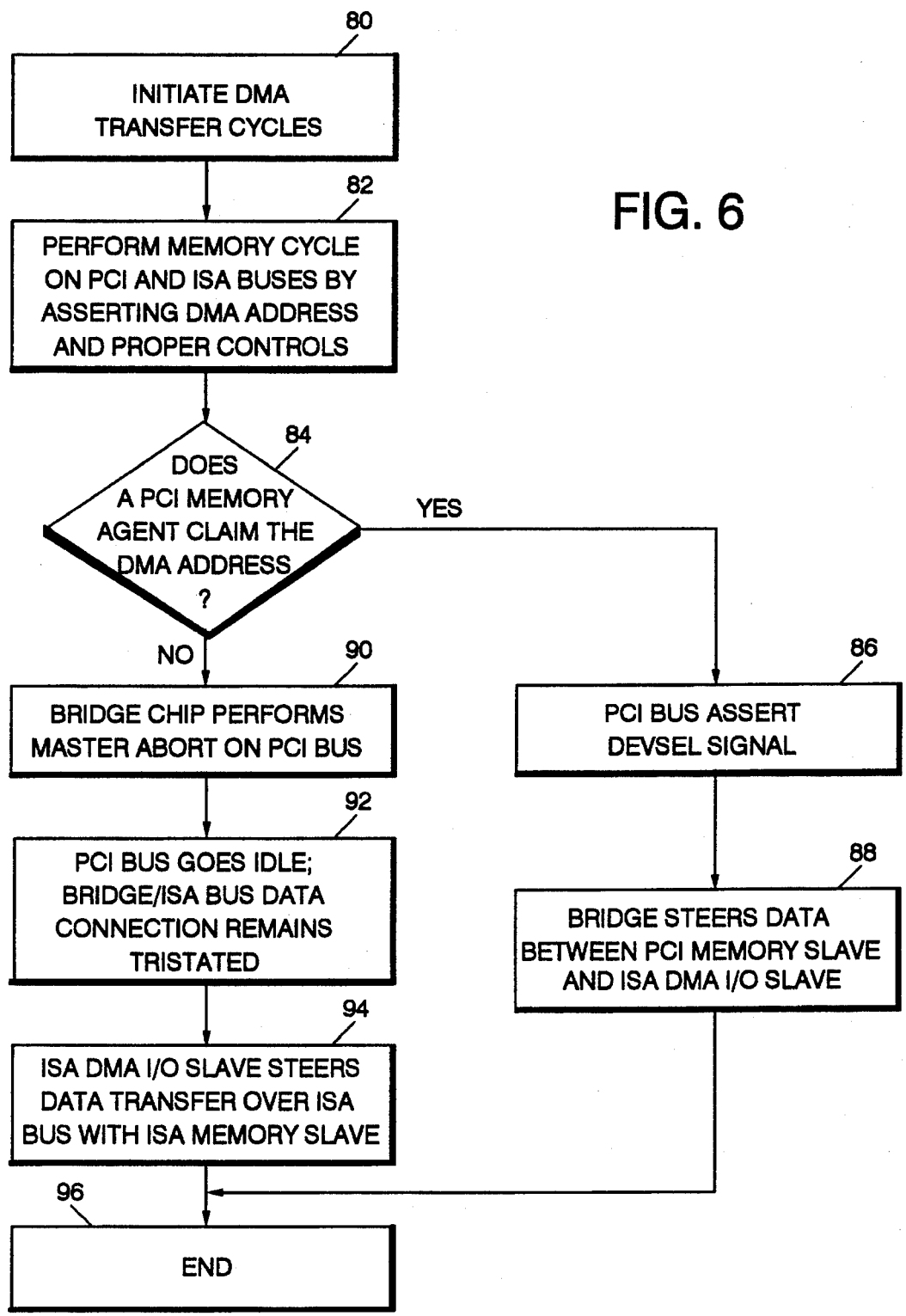

BRIDGE BETWEEN TWO BUSES OF A COMPUTER SYSTEM THAT DETERMINES THE LOCATION OF MEMORY OR ACCESSES FROM BUS MASTERS ON ONE OF THE BUSES

BACKGROUND OF THE INVENTION

1. Field of the Invention

The present invention relates to the field of digital computer systems, and more particularly, to the determination of a memory location or accesses from the bus masters of one bus of a system which has two or more buses.

2. Description of Related Art

In computer systems, electronic chips and other components are connected with one another by buses. A variety of components can be connected to the bus providing intercommunication between all of the devices that are connected to the bus. One type of bus which has gained wide industry acceptance is the industry standard architecture (ISA) bus. The ISA bus has twenty-four (24) memory address lines which therefore provides support for up to sixteen megabytes of memory. The wide acceptance of the ISA bus has resulted in a very large percentage of manufactured devices being designed for use on the ISA bus. However, higher-speed input/output devices commonly used in computer systems require faster buses. A solution to the general problem of sending and receiving data from the processor to any high-speed input device is a local bus. Unlike the ISA bus, which operates relatively slowly with limited bandwidth, a local bus communicates at system speed and carries data in 32-bit blocks. Local bus schemes remove from the main system bus those interfaces that need quick response, such as memory, display, and disk drives. One such local bus that is gaining acceptance in the industry is the peripheral component interconnect (PCI) bus. The PCI bus can be a 32 or 64-bit pathway for high-speed data transfer. Essentially, the PCI bus is a parallel data path provided in addition to an ISA bus. The system processor and memory can be attached directly to the PCI bus, for example. Other devices such as graphic display adapters, disk controllers, etc. can also attach directly to the PCI bus.

A bridge chip is provided between the PCI bus and the ISA bus in order to provide communication between devices on the two buses. The bridge chip essentially converts ISA bus cycles to PCI bus cycles, and vice versa.

Many of the devices attached to the PCI bus and the ISA bus are master devices that conduct processing independently of the bus or other devices. Other components coupled to the bus are considered to be slaves or targets that accept commands and respond to requests of a master. The PCI bus has an addressing capability of 32 bits to provide for 4 gigabytes of memory access. A master on the ISA bus can access a memory location in the memory on the PCI bus.

In the prior art systems using a PCI bus and an ISA bus, the bridge chip between the PCI bus and ISA bus included programmable registers which contain information as to which bus a particular segment of memory is mapped to. When the direct memory access (DMA) controller of the bridge chip performs a transfer cycle, the bridge chip would compare the memory address received from the ISA DMA bus master to the values in the registers. This requires the use of a PCI decoder as well as an ISA decoder. When a range comparison in a particular decoder indicates that the segment of memory is mapped to a particular bus, the memory cycle is performed on that particular bus only and not on the other bus. When an ISA bus master is performing a memory cycle on the ISA bus, the memory address is also compared by the PCI decoder in the bridge chip and the memory cycle is performed on the PCI bus if a range comparison occurs.

The prior art arrangement using a PCI decoder, an ISA decoder, and supporting software for setting up ranges requires a relatively large amount of hardware and software for implementation.

SUMMARY OF THE INVENTION

There is a need for a system that has a bridge between first and second buses that allows memory to be accessed from either bus without address decoding logic or software for determining on which bus the memory resides.

This and other needs are met by the present invention which provides a bridge for interfacing a plurality of buses in a system which has a first bus, a first bus master and a first bus slave coupled to the first bus, the first bus master issuing a memory address to perform a memory cycle, a second bus, and a second bus slave coupled to the second bus. The bridge comprises: logic for receiving the memory address from a first bus master and simultaneously generating signals to cause a memory cycle to be performed on the first and second buses, and logic for detecting whether a second bus slave claims the memory address. The bridge also has logic for steering data between the first and second buses when a second bus slave claims the address, and logic for isolating the second bus from the first bus when the second bus slave does not claim the memory address such that data is transferred between the first bus master and the first bus slave.

The above stated needs are also met by another embodiment of the present invention which provides a computer system comprising a first bus, a first bus master and a first bus memory slave coupled to the first bus. The first bus master issues a memory address to perform a memory cycle. The system includes a second bus and a second bus memory slave coupled to the second bus. A bridge is coupled between the first and second buses. The bridge has logic for receiving the memory address from the first bus master and performing a memory cycle on the second bus simultaneously with the memory cycle on the first bus. The logic detects whether the second bus memory slave claims the memory address, and steers data between the first and second buses when the second bus memory slave claims the address. The bridge isolates the second bus from the first bus when the second bus memory slave does not claim the memory address so that data is transferred between the first bus master and the first bus memory slave.

In preferred embodiments of the invention, the first bus is an industry standard architecture (ISA) bus, and the second bus is a peripheral controller interconnect (PCI) bus.

The present invention allows memory accesses to be performed from an ISA bus master or an ISA DMA without regard to the physical location of the memory and without the use of decoding logic or software. Rather than making a comparison of a memory address to ranges of addresses located on the separate buses, the present invention simultaneously performs a memory cycle on both of the first and second buses. If the memory access is to be performed on the second bus, such as the PCI bus, the memory slave on the PCI bus will claim the memory address. The bridge recognizes this claiming of the memory address by the PCI memory slave and steers the data between the first and second buses. This steering can be accomplished by enabling data driers connected to the ISA bus and the bridge.

When no second bus memory slave claims the memory address, the second bus is isolated from the first bus to allow the transaction to be performed only on the first bus. This isolation can be done, for example, by the bridge chip tristating the data drivers.

The approach of the present invention requires a significantly smaller amount of logic than the prior art arrangement, and does not require any decoding software.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram of a prior art arrangement of a computer system.

FIG. 3 is a block diagram of the computer system of FIG. 1 constructed in accordance with an embodiment of the present invention.

FIG. 6 is a flow chart of an exemplary embodiment of a method of operation of the present invention.

DETAILED DESCRIPTION OF THE ILLUSTRATIVE EMBODIMENTS

Figure 1:
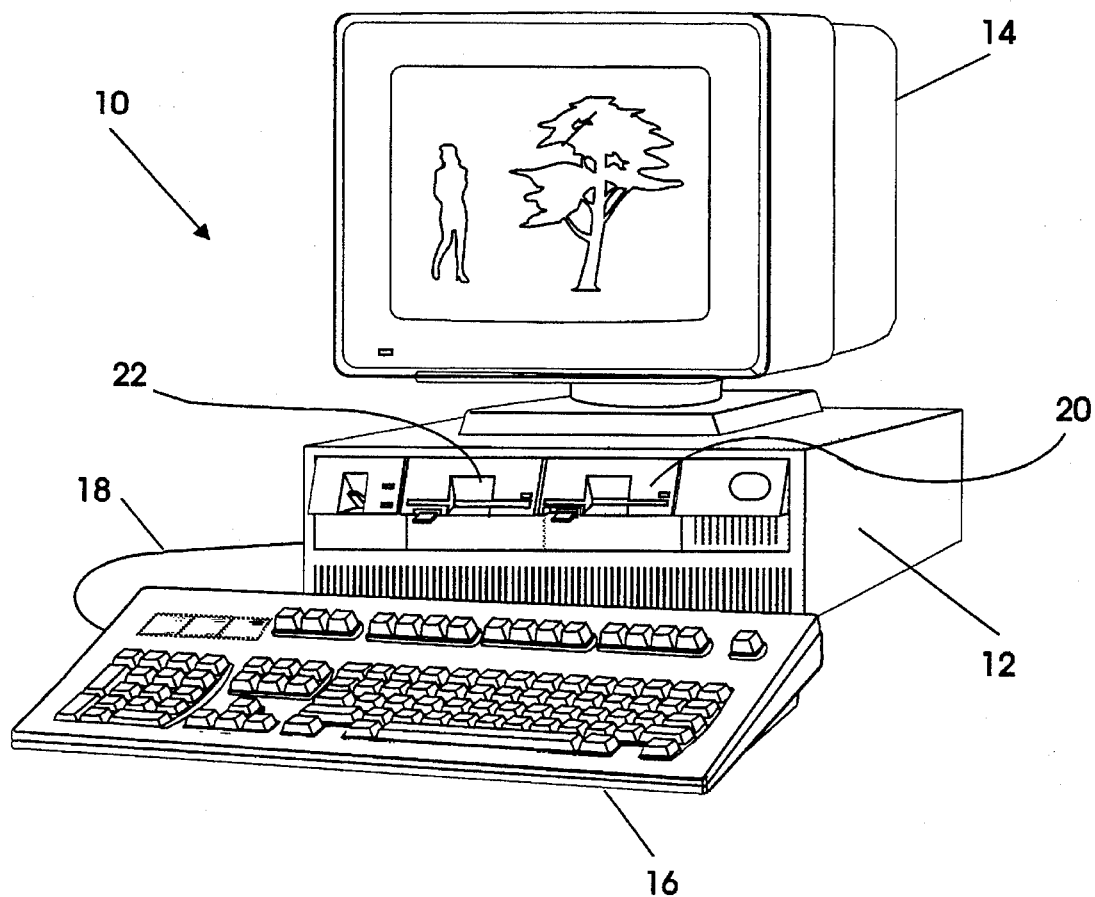
FIG. 1 is a perspective view of a computer system of the present invention.

With reference now to the Figures and in particular with reference to FIG. 1, a conventional computer, or PC, designated 10, is of the environment to which the invention has particular utility. Computer 10 which preferably, but not necessarily, is of a type utilizing an IBM personal computer or a similar system, includes a console housing 12 in which a circuit board containing the necessary circuitry including a microprocessor and BIOS chips, controllers, random access memory and other hardware are arranged. The computer will also include a video display 14 and a keyboard 16 connected to the housing 12 through cable 18. Mass storage media includes a hard disk drive within the housing and is non-accessible to the user, and user-accessible floppy disks, as well as, optionally, CD-ROM drives 20 and 22.

FIG. 2 is a block diagram of a prior art arrangement of a computer system. A local bus 30, such as a peripheral controller interconnect (PCI) bus 30 has a PCI memory slave 40 coupled to the bus 30. The computer system also has a second bus serving as an expansion bus 32. This expansion bus 32 can be, for example, an industry standard architecture (ISA) bus. Although the ISA bus 32 is much slower than the PCI bus 30, the ISA bus 32 is useful since many devices that can be coupled to the ISA bus 32 are not able to perform at a rate of speed commensurate with the speed of the PCI bus 30. The configuration of FIG. 2 therefore provides a first bus 30 which allows the use of high-speed devices, and a second bus 32 which allows the use of lower-speed devices, to therefore provide backward compatibility.

A bridge chip 34 is coupled between the PCI bus 30 and the ISA bus 32. An ISA bus master 36, an ISA memory slave 38 and a DMA I/O slave 39 are coupled to the ISA bus 32.

The bridge chip 34 forms an interface between the PCI bus 30 and the ISA bus 32. An ISA bus interface 42 in the bridge chip 34 translates ISA bus cycles into internal system bus cycles for use by the bridge chip 34, and system bus cycles to ISA bus cycles. A PCI bus interface 46 converts PCI bus cycles from the PCI bus 30 into system bus cycles for the bridge chip 34, and system bus cycles to PCI bus cycles. A DMA controller 50 provides DMA control of memory accesses within the system.

The bridge chip 34 has an ISA decoder 44 and a PCI decoder 48 which decode memory addresses and compare these memory addresses to values stored in registers. Certain ranges of memory will be located in memory slaves located on the PCI bus 30, while other memory ranges will be located in slaves connected to the ISA bus 32. When the internal DMA controller 50 of the bridge 34, or the ISA bus master 36 performs a transfer cycle by asserting a memory address, the bridge chip 34 compares the decoded memory address to the values stored in the registers. When the comparison in one of the decoders 44, 48 indicates that the memory address is for that particular bus, a memory cycle is performed on that bus and not on the other bus. Additionally, when an ISA bus master performs a memory cycle on the ISA bus, the memory address is also compared by the PCI decoder 48 and a memory cycle is performed on the PCI bus 30, if a PCI range comparison is successful.

The prior art arrangement requires a relatively large amount of logic for the decoders 44, 48 and software for programming the ranges of the memory in the registers of the bridge chip 34.

The present invention reduces the amount of hardware and software in comparison to the prior art by simultaneously performing memory cycles on both buses regardless of the memory address, as will be described below.

FIG. 3 is a block diagram of a computer system constructed in accordance with an embodiment of the present invention. The system of the present invention includes a PCI bus 30, an ISA bus 32, with an ISA master 36, an ISA memory slave 38 and a DMA I/O slave 39. A PCI memory slave 40 is coupled to the PCI bus 30. Although only one ISA master 36, ISA slave 38 and PCI memory slave 40 are depicted in FIG. 3, this is for illustration purposes only as the system is normally configured with a plurality of these elements.

A bridge chip 52 contains an ISA interface 56 coupled between the ISA bus 32 and an internal system bus 60. A PCI interface 58 is provided between the PCI bus 30 and the system bus 60. The bridge chip 52 also has a DMA controller 54. The DMA controller 54 is coupled to the ISA bus 32.

Either the DMA controller 54 or the ISA bus master 36 can generate transfer cycles, since the DMA controller 54 acts as a bus master on the ISA bus 32. Both the ISA master 36 and the DMA controller 54 can access memory located on either the ISA bus 32 or the PCI bus 30. For ease of explanation in the following description, however, examples will be described in which the ISA master 36 is generating transfer cycles. When this occurs, the DMA controller 54 acts as an arbitration device.

When the ISA master 36 generates a transfer cycle, the ISA master 36 produces a memory address. This is the starting address and indicates the designation of transfer data. The memory address is provided to the ISA interface 56 and the PCI interface 58. These interfaces 56, 58 initiate e a memory cycle simultaneously on the respective buses 32, 30.

After the memory cycle has been initiated on each of the buses 30, 32, the PCI interface 58 monitors the PCI bus 30 for a device select signal (DEVSEL#) to be asserted by one of the memory slaves 40 located on the PCI bus 30. The assertion of the select signal device DEVSEL# by a PCI memory slave 40 indicates that the PCI memory slave 40 has claimed the memory address and that the memory transfer is between the ISA bus master 36 and the PCI slave 40. A device select signal DEVSEL#must be received by the PCI interface 58 within a certain amount of time (for example, five PCI clock cycles) after the initiation of the memory cycle on the PCI bus 30. If the device select signal is received, data drivers 55 in the ESA interface 56 are enabled by a signal (DATA-DRIVER-ENABLE) from the PCI interface 58. This steers the data between the memory slave 40, the PCI bus 30, the system bus 60, the ISA bus 32 and the ISA bus master 36.

When the PCI interface 58 does not receive the device select signal DEVSEL# from a PCI memory slave 40 within the predetermined time period after initiation of the memory cycle, the PCI interface 58 will perform a master abort termination on the PCI bus 30 which effectively ends the memory cycle on the PCI bus 30. The data driver enable signal (DATA-DRIVER-ENABLE) from the PCI interface 58 will be false, causing the data drivers 55 to be tristated. This essentially isolates the data connections of the ISA bus 32 from the PCI bus 30. The memory cycle will then be performed only on the ISA bus 32 between the ISA bus master 36 and the ISA slave 38.

As a further enhancement of the present invention, certain embodiments examine only the upper eight bits of a 32-bit DMA address, and if any of these bits are set to a one, this will indicate the memory is located on the PCI bus 30. The bridge chip 52 therefore will initiate a memory cycle only on the PCI bus 30. Upon receiving a device select signal from the memory slave 40, the PCI interface 58 will then enable the data driver 64 to steer the data between the ISA master 36 and the PCI memory slave 40.

Figure 4:
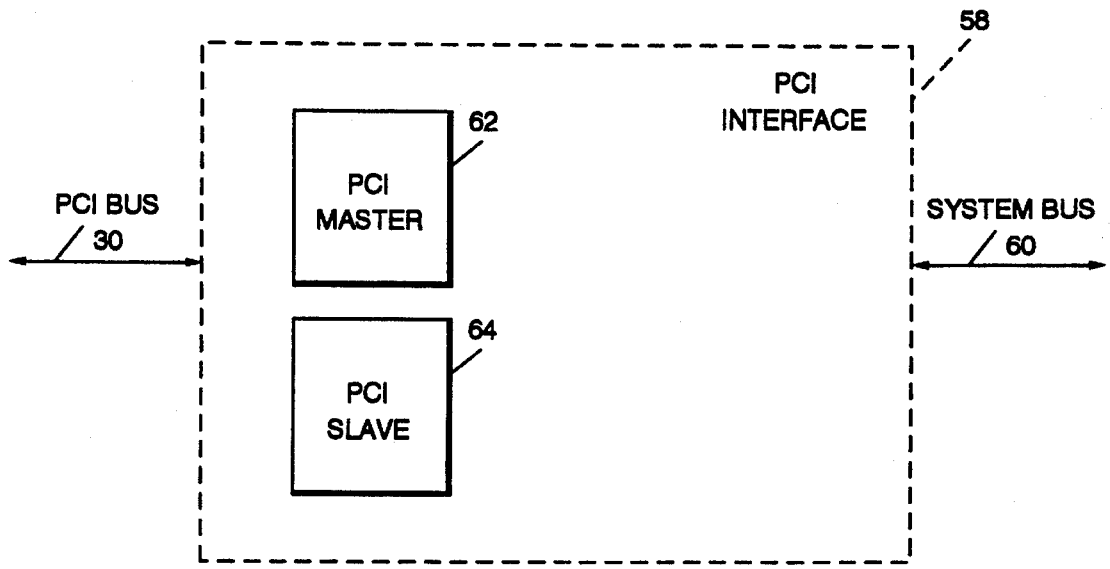
FIG. 4 is a block diagram of an exemplary embodiment of a PCI interface used in the embodiment of FIG. 3.

An exemplary embodiment of the PCI interface is depicted in the block diagram of FIG. 4. Inside the PCI interface 58 is a PCI master element 62 and a PCI slave element 64. These elements are state machines that handle the master/slave operations for interfacing with the PCI bus 30. The master and slave are selected depending upon whether or not an ISA bus master 36 is trying to access the PCI bus 30. If the ISA bus master 36 is trying to access the PCI bus 30, the bridge chip 52 will act as a master on the PCI bus 30, and utilizes the PCI master element 62 to perform read and write operations for memory and I/O devices on the PCI bus 30. The PCI slave element 64 is used when the bridge chip 52 is a slave on the PCI bus 30 and translates memory and I/O commands from the PCI bus 30 to the ISA bus 32, through the system bus 60.

Figure 5:
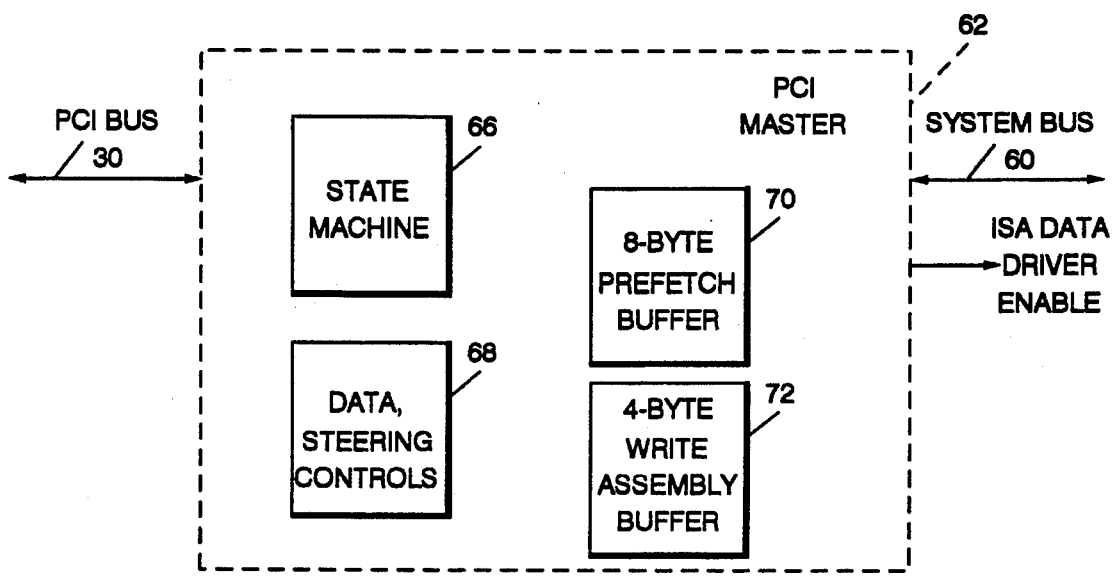
FIG. 5 is a block diagram of an exemplary embodiment of a PCI master used in the PCI interface of FIG. 4.

FIG. 5 is a block diagram of an exemplary embodiment of the PCI master 62. Inside the PCI master 64 there is a state machine 66, data, steering controls 68 and an 8-byte prefetch buffer 70. Inside of the PCI state machine 66, there is logic to run the specific PCI bus cycles. State machine 66 receives requests from the system bus 60 and performs reads or writes on the PCI bus 30 in response to these requests. Also the state machine 66 has logic for detecting the device select signal on the PCI bus 30 and determining if the slave 40 on the PCI bus 30 has responded to a master initiated cycle. There is also a timer that counts the number of clocks until the device select signal is returned. If the device select signal has not been returned when the timer reaches a count of, for example five, the definition of a PCI master abort cycle has been met and the PCI master state machine will complete the PCI bus cycle and enter an idle state. Simultaneously, the state machine 66 returns a signal to the ISA interface informing the ISA interface 56 that the device on the PCI bus 30 has not claimed the cycle and that the ISA data bus driver 55 should be disabled.

The eight byte prefetch buffer 70 allows the PCI master 58 to perform 8-byte transfers of memory information on the PCI bus 30. A 4-byte write assembly buffer 72 is utilized for write transactions destined for the PCI bus 30. The write assembly buffer 72 assembles 8or 16-bit blocks of information from the ISA bus 32 into a 32-bit (4-byte) block of information to be written onto the PCI bus 30.

A flow chart of an exemplary embodiment of the method of the present invention to perform DMA transfers is depicted in FIG. 6. In step 80, a DMA controller 54 or an ISA master 36 will initiate a DMA transfer cycle. A memory cycle is then performed on both the PCI bus 30 and the ISA bus 32 by asserting the DMA address, in step 82.

In step 84, it is determined whether a PCI memory slave agent claims the DMA address that has been asserted on the PCI bus. If a PCI memory slave 40 claims the DMA address, the device select DEVSEL signal is asserted on the PCI bus 30 in step 86. This causes the bridge chip 52 to steer data between the PCI memory slave 40 and the ISA master 36, in step 88.

If a PCI memory slave 40 does not claim the DMA address in step 84, (within a specified time period), the bridge chip 52 performs a master abort in step 90. The PCI bus 30 goes idle in step 92, and the bridge chip 52—ISA data bus 32 connection remains tristated. The ISA bus master 36 performs a data transfer over the ISA bus 32 with an ISA memory slave 38, in step 94. From both steps 8B and 94, the method proceeds to the end 96 to allow another DMA transfer cycle to be initiated.

Although the present invention has been described and illustrated in detail, it is clearly understood that the same is by way of illustration and example only and is not to be taken by way of limitation, the spirit and scope of the present being limited only by the terms of the appended claims.

What is claimed is:

1. A bridge for interfacing a plurality of buses in a system which has a first bus, a first bus master and a first bus slave coupled to the first bus, the first bus master issuing a memory address to perform a memory cycle, a second bus, and a second bus slave coupled to the second bus, the bridge comprising:

logic for receiving the memory address from a first bus master and simultaneously generating signals to cause a memory cycle to be performed on the first and second buses concurrently;

logic for detecting whether the second bus slave claims the memory address;

logic for steering data between the first and second buses when the second bus slave claims the address; and logic for isolating the second bus from the first bus when the second bus slave does not claim the memory address such that data is transferred between the first bus master and the first bus slave.

2. The bridge of claim 1, further comprising a data connection for coupling the bridge to communicate data with a first bus, and wherein the logic for isolating the second bus includes logic for tristating the data connection when the second bus slave does not claim the memory address.

3. The bridge of claim 2, further comprising logic for determining whether the second bus slave has claimed the memory address within a specified time period.

4. The bridge of claim 3, wherein the first bus is an industry standard architecture (ISA) bus, and the second bus is a peripheral controller interface (PCI) bus and the bridge includes interfaces for coupling the bridge to the ISA bus and to the PCI bus.

5. The bridge of claim 4, wherein the bridge recognizes that a second bus slave claims the memory address by receipt of a device select signal within the specified time period.

6. The bridge of claim 5, further comprising logic for performing a PCI master abort cycle when the bridge does not receive the device select signal within the specified time period.

7. The bridge of claim 1, wherein at least one of the first bus slave and the second bus slave is a DMA I/O slave.

8. The bridge of claim 1, wherein at least one of the first bus slave and the second bus slave is a memory slave.

9. The bridge of claim 1, wherein at least one of the first bus slave and the second bus slave is an I/O slave.

10. A computer system comprising:

a first bus;

a first bus master and a first bus slave coupled to the first bus, the first bus master issuing a memory address to perform a memory cycle;

a second bus;

a second bus slave coupled to the second bus;

a bridge coupled between the first and second buses, the bridge having logic for receiving the memory address from the first bus master and simultaneously performing a memory cycle on the second bus with a memory cycle on the first bus, for detecting whether the second bus slave claims the memory address, and for steering data between the first and second buses when the second bus slave claims the address and isolating the second bus from the first bus when the second bus slave does not claim the memory address such that data is transferred between the first bus master and the first bus slave.

11. The system of claim 10, wherein the bridge has a data connection coupled to the first bus, and the logic for isolating the second bus includes logic for tristating the data connection when the second bus slave does not claim the memory address.

12. The system of claim 11, wherein the bridge includes logic for determining whether the second bus slave has claimed the memory address within a specified time period.

13. The system of claim 12, wherein the first bus is an industry standard architecture (ISA) bus, and the second bus is a peripheral controller interface (PCI) bus.

14. The system of claim 13, wherein the second bus slave claims the memory address by asserting a device select signal within the specified time period.

15. The system of claim 14, wherein the bridge includes logic for performing a PCI master abort cycle when the second bus slave does not assert the device select signal within the specified time period.

16. The system of claim 10, wherein at least one of the first bus slave and the second bus slave is a DMA I/O slave.

17. The system of claim 10, wherein at least one of the first bus slave and the second bus slave is a memory slave.

18. The system of claim 10, wherein at least one of the first bus slave and the second bus slave is an I/O slave.

* * * * *